(No Model.)
J. A. PALETHORPE.
HUMIDIFYING APPARATUS.
No. 553,259. Patented Jan. 21, 1896.
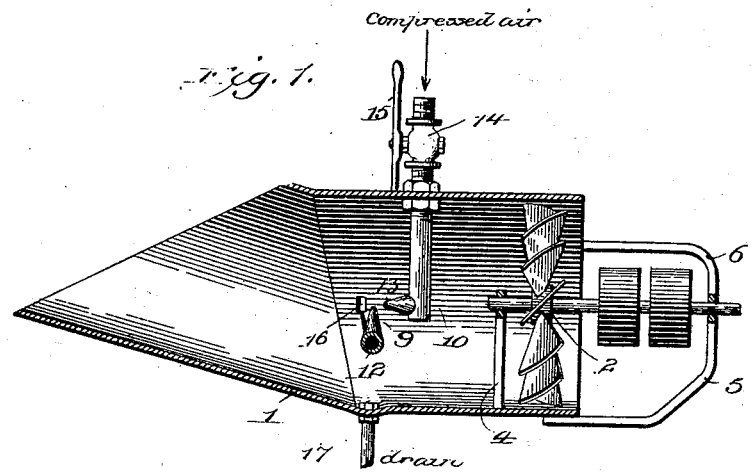
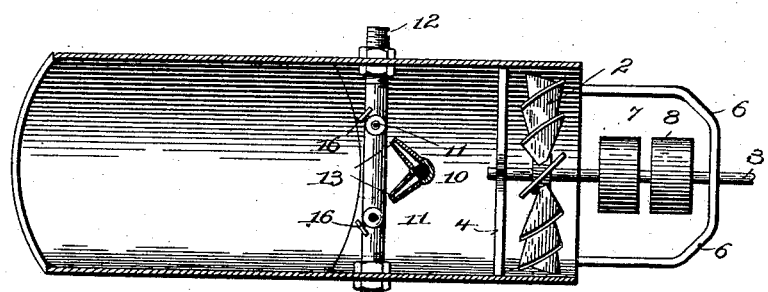
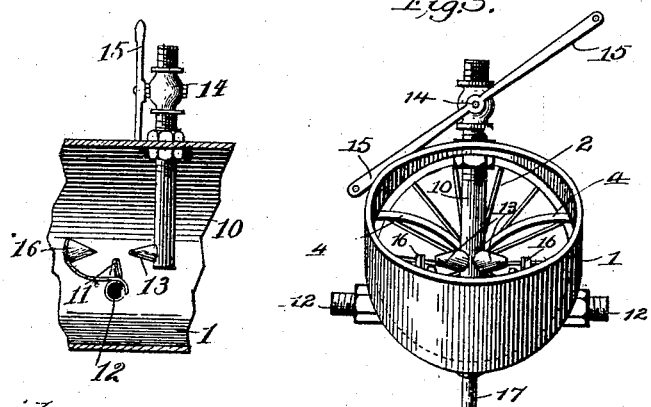
Witnesses:
Harry B. Pohen
Walter E. Allen
Inventor:
J. A. Palethorpe.
by Knight Bros
Attys.

United States Patent Office.

JAMES ARTHUR PALETHORPE, OF LIVERPOOL, ENGLAND.

HUMIDIFYING APPARATUS.

SPECIFICATION forming part of Letters Patent No. 553,259, dated January 21, 1896.

Application filed May 3, 1895. Serial No. 548,034. (No model.)

*To all whom it may concern:*

Be it known that I, JAMES ARTHUR PALETHORPE, a subject of the Queen of Great Britain, and a resident of Liverpool, England, have invented certain new and useful Improvements in Humidifying Apparatus, of which the following is a specification.

My invention relates to an apparatus for supplying to a factory or other place atmosphere ladened with moisture to any desired degree or for taking atmosphere of such a place and supplying it with moisture. Incidentally to the above object my invention is likewise adapted to regulate the temperature of the moist air supplied or of the air which is moistened by regulating the temperature of the water which is employed in carrying out said object.

My invention consists in certain novel construction of apparatus to be employed for the purposes named, as will hereinafter be fully described, and particularly pointed out in the claims.

In the accompanying drawings, Figure 1 is a vertical longitudinal section of the apparatus. Fig. 2 is a horizontal section of the same. Fig. 3 is an end elevation, and Fig. 4 a modification.

The apparatus comprises a funnel 1 preferably formed with the horizontal cylindrical portion and an upwardly-inclined cylindrical portion cut by a plane inclined to the axis, the horizontal cylindrical portion containing and constituting the casing of a rotary blower 2, which is mounted on the shaft 3 supported at its inner end by a spider 4 and at its outer end in a frame 5 6, said shaft being provided with fast and loose pulleys 7 and 8 to receive a belt from any suitable source of power and said horizontal portion of the funnel having introduced through its walls suitable water-supply 9 and a compressed-air atomizer 10. When the parts are in operation the water is atomized by the blast of compressed air so as to make a vapor, and the air to be supplied from the outside to the factory or other place, or the air in said place to be treated and returned, is passed through the funnel by means of the rotary blower, so that the vapor or atomized water which is constantly supplied by the co-operation of the parts 9 and 10 is entirely taken up and borne away by the flow of the air through the funnel.

The water is supplied through one or more jets 11 projecting vertically from the horizontal supply-pipe 12, while the air which comes from any suitable compressing device is delivered through a corresponding number of blast-nozzles 13 directly across and at right angles to the water-jets 11 in quantity and under pressure, regulated at will by a valve 14 under control of cross-arms 15 which may be manipulated through the medium of any suitable connections common for such purposes. On the opposite sides of the water-jets from the blast-nozzles and directly in line therewith are dispersers or deflectors 16, against which the jets of water are forcibly driven by the air-blasts in order to complete the disintegration of the water.

Any water or moisture precipitated after leaving the jets 11, which is unusual, will be deposited upon the inclined portion of the funnel in front of the blast-nozzle and will drain back to the intersection of this part with the horizontal portion and there escape through a drain 17. If the air-blast is properly regulated with relation to operation of the rotary blower there will be no deposit of water, but the entire amount thereof will be borne away by the air which is treated. By the construction which I have described, no special exterior means for forcing in the water is required. The introduction of water is dependent entirely upon the exhausting action of the blast. In this feature I find great advantage, inasmuch as the proper proportion of water is always drawn in by the blast to thoroughly atomize it, and the degree of humidity to be imparted to the atmosphere is controlled by the single valve 14, and involves no waste.

By the use of the apparatus as above described, heated or cold air may be humidified to any desired degree, even up to a point of saturation and conducted to any room or compartment for use, the air being drawn either from the outside of the room or compartment directly into the humidifier or through a suitable heater for preliminary warming. On the other hand, by regulating the temperature of water which is supplied, the temperature of the air to be treated can be regulated. Not only do I find the apparatus especially useful for humidifying the atmosphere of tobacco-factories, weaving-factories and similar places, but it is convenient and effective for cooling the temperature of such places in warm weather.

While any form of deflector may be employed, I prefer to use one of conical shape, as shown in Fig. 4, as this form is found in practice to give much better results than a flat one.

To produce the necessary air-blast through nozzles 13, which are preferably quarter-inch interchangeable nozzles, it is simply necessary to use a nine or twelve inch rotary blower of common construction.

While my improved apparatus is capable of use in the ways hereinbefore mentioned, I also find it convenient to introduce the outer end, in which the fan is located, through an outer wall of the factory or other place and introduce fresh air constantly. Inasmuch as the end is approximately only about eighteen inches in diameter it is conveniently introduced through a window.

I find in practice that an apparatus of this capacity will constantly supply one hundred and fifty thousand cubic feet per hour moistened to any desired degree up to dew-point.

While I have described at some length the minor details of construction of the preferred embodiment of my invention, I desire it understood that the scope of my invention is by no means thus limited, but is rather defined by the claims forming part of this specification.

What I claim, and desire to secure by Letters Patent, is—

1. In a device of substantially the character specified, the combination of a passage for the air to be treated, and humidifying means comprising a water supply and an air blast device operating independent of the air to be treated, cooperating with the water supply, and producing a vapor to be taken up by the air to be treated as explained.

2. In a device of substantially the character specified, the combination of a funnel or equivalent air conducting passage, means for forcing therethrough air to be treated, an independent air blast device discharging into the funnel or passage, and a water supply delivering into the path of the blast, substantially as and for the purpose set forth.

3. In a humidifying apparatus, the combination of a funnel containing an air blower adapted to receive driving connections, a water supply terminating in a jet within said funnel, and an air blast nozzle adapted for connection with suitable air compressing device and terminating in operative relation to the water jet, substantially as and for the purpose set forth.

4. In a humidifying apparatus the combination of a funnel inclined substantially as shown and having a drain into which the water is delivered by said inclined portion, a suitable water supply and means for atomizing the water, and an air forcing blower for passing air through the funnel toward the inclined portion, whereby the water precipitated is collected by the latter, as explained.

5. In a humidifying apparatus, the combination of a funnel through which the air to be treated is introduced, a water supply terminating in jets within said funnel, an air blast delivering across the path of said water jet, and a disperser on the opposite side of said jet from the air blast, substantially as and for the purpose set forth.

6. In a humidifying apparatus, the combination of the funnel through which is passed the air to be treated, a water supply pipe having a pair of nozzles projecting upwardly in said funnel, and an air pipe projecting into the funnel and terminating in the pair of horizontal blast nozzles at right angles to the water jet, and having the controlling valve 14 substantially as and for the purposes set forth.

J. ARTHUR PALETHORPE.

Witnesses:
H. S. KNIGHT,
H. M. STERLING.